United States Patent [19]

Tojo et al.

[11] Patent Number: 5,965,233
[45] Date of Patent: Oct. 12, 1999

[54] LAMINATE FILM AND MAGNETIC RECORDING MEDIUM USING THE SAME

[75] Inventors: Mitsuo Tojo; Makoto Handa; Toshifumi Osawa, all of Sagamihara, Japan

[73] Assignee: Teijin Limited, Osaka, Japan

[21] Appl. No.: 08/869,479

[22] Filed: Jun. 5, 1997

[30] Foreign Application Priority Data

Jun. 6, 1996 [JP] Japan ................................. 8-144153
Jun. 6, 1996 [JP] Japan ................................. 8-144154

[51] Int. Cl.⁶ ........................................ B32B 3/10
[52] U.S. Cl. ...................... 428/141; 428/323; 428/327; 428/407
[58] Field of Search ..................... 428/141, 323, 428/327, 407, 694 SG, 694 SL, 900

[56] References Cited

U.S. PATENT DOCUMENTS 5,328,745  7/1994  Kurihara et al. .

FOREIGN PATENT DOCUMENTS

| | | |
|---|---|---|
| 0 522 758 A1 | 1/1993 | European Pat. Off. . |
| 0 543 600 A2 | 5/1993 | European Pat. Off. . |
| 0583 169 A2 | 2/1994 | European Pat. Off. . |
| 0 755 975 A2 | 1/1997 | European Pat. Off. . |
| 93 07 644 | 9/1993 | Germany . |
| 52-134706 | 11/1977 | Japan ................................. G11B 5/02 |
| 54-147010 | 11/1979 | Japan ................................. G11B 5/66 |
| 56-16937 | 2/1981 | Japan ................................. G11B 5/66 |
| 58-68223 | 4/1983 | Japan ................................. G11B 5/66 |
| 60-180837 | 9/1985 | Japan ............................. B32B 27/14 |
| 60-180838 | 9/1985 | Japan ............................. B32B 27/14 |
| 60-180839 | 9/1985 | Japan ............................. B32B 27/36 |
| 2-214657 | 8/1990 | Japan ............................. B32B 27/36 |
| 3-73409 | 3/1991 | Japan ................................. G11B 5/66 |
| 3-80410 | 12/1991 | Japan ............................. B29C 55/12 |
| 5-194772 | 8/1993 | Japan ................................. C08J 7/04 |
| 5-210833 | 8/1993 | Japan ................................. G11B 5/66 |
| 7-80282 | 8/1995 | Japan ............................. B32B 27/36 |

OTHER PUBLICATIONS

Kashiwagi et al., "High Density Magnetic Recording by Means of Thin Layer Particulate Media on a Research of ATOM for high Density Recording"; The Institute of Electronics Information and Communication Engineers; Technical Report; MR94–78, (1992–02).

*Primary Examiner*—Stevan A. Resan
*Attorney, Agent, or Firm*—Sughrue, Mion, Zinn, Macpeak & Seas, PLLC

[57] ABSTRACT

A laminate film comprises a base film and a second film layer containing core-shell particles and a hydrophilic resin. The laminate film is useful for a base film for a magnetic recording medium.

19 Claims, No Drawings

LAMINATE FILM AND MAGNETIC RECORDING MEDIUM USING THE SAME

DETAILED DESCRIPTION OF THE INVENTION

This invention relates to a laminate film and to a magnetic recording medium using the same. More specifically, it relates to a laminate film having excellent wind-up property, slipperiness and handling properties and to a magnetic recording medium having excellent electromagnetic conversion characteristics, drop out characteristics, running property of a magnetic layer and durability, a high-density magnetic recording medium in particular.

In recent years, remarkable progress has been made in high-density magnetic recording, as exemplified by the development and implementation of a thin ferromagnetic metal film magnetic recording medium in which a thin ferromagnetic metal film is formed on a non-magnetic base film by a physical deposition method such as vacuum vapor deposition or sputtering or a plating method and a thin layer coated magnetic recording medium in which a needle-shaped magnetic powder such as a metal powder or iron oxide powder is coated to a thickness of not larger than 2 μm.

Known examples of the former include a Co-deposited tape (refer to JP-A 54-147010 (the term "JP-A" as used herein means an "unexamined published Japanese patent application")) and a vertical magnetic recording medium made from a Co—Cr alloy (refer to JP-A 52-134706) whereas known examples of the latter include an extremely thin layer coated medium for high-density magnetic recording (refer to Technical Report MR 94-78 issued by the Institute of Electronics and Communication Engineers of Japan (1995-02)).

Since a coated magnetic recording medium of the prior art, i.e., a magnetic recording medium in which a mixture of magnetic powders and an organic polymer binder is coated on a non-magnetic base film, is low in recording density and has a long recording wavelength, the thickness of its magnetic layer is as large as about 2 μm or more. On the other hand, a thin metal film formed by thin film forming means such as vacuum vapor deposition, sputtering or ion plating has an extremely small thickness of 0.2 μm or less. In the case of an extremely thin layer coated medium, too, a coated magnetic layer is as extremely thin as 0.13 μm, though a non-magnetic base layer is provided.

In the above high-density magnetic recording medium, the surface condition of the non-magnetic base film has a great influence on the surface characteristics of the magnetic recording layer. Particularly, in the case of a thin metal film magnetic recording medium, the surface condition of the non-magnetic base film appears directly as an uneven surface of a magnetic recording layer, thereby causing noise in reproduction signals. Therefore, it is desirable that the surface of the non-magnetic base film be as smooth as possible.

On the other hand, from a viewpoint of the formation of a non-magnetic base film and handling properties such as transportation, scratching, wind-up and wind-off in the process of film formation, the film having a too smooth surface is not desirable because slipperiness between films deteriorates, a blocking phenomenon occurs, roll formation of the base film becomes difficult and consequently, the yield of products lowers, thereby inducing an increase in production costs. Therefore, from a viewpoint of production costs, it is desirable that the surface of the non-magnetic base film be as rough as possible.

In this way, the surface of the non-magnetic base film is required to be smooth from a viewpoint of electromagnetic conversion characteristics, whereas it is required to be rough from a viewpoint of handling properties and film costs.

Further, in the case of a thin deposited metal film magnetic recording medium, a serious problem encountered when it is actually used is the insufficient running property of the surface of a thin metal film. In the case of a coated magnetic recording medium in which a magnetic powder is mixed into an organic polymer binder and the resulting mixture is coated on a base film, the running property of the magnetic surface can be improved by dispersing a lubricant in the binder. However, in the case of a thin deposited metal film magnetic recording medium, such measure cannot be taken, and it is extremely difficult to maintain a stable running property. The running property is inferior especially under high-temperature and high-humidity conditions.

To supply an inexpensive high-quality base film for a high-density recording medium, therefore, it is necessary to satisfy the above two contradictory requirements at the same time.

As means for realizing this, there have been proposed (1) a method for forming a discontinuous film by coating a particular coating on the surface of a film (refer to JP-B No. 3-80410 (the term "JP-B" as used herein means "Japanese patent publication"), JP-A Nos. 60-180839, 60-180838, 60-180837, 56-16937 and 58-68223), (2) a method for forming a continuous film having a fine uneven surface (refer to JP-A Nos. 5-194772 and 5-210833), (3) a method for forming different front and rear surfaces by such a technology as coextrusion (refer to JP-A No. 2-214657 and JP-B No. 7-80282), and (4) a method which combines the above methods (1) and (3) or (2) and (3) (refer to JP-A No. 3-73409).

However, although the above conventional methods for forming an discontinuous film and a continuous film having a fine uneven surface can solve such problems as insufficient slipperiness between films and blocking, they have such another problem as unstable quality as a magnetic tape, because the electromagnetic conversion characteristics of the magnetic tape deteriorate as it is difficult to uniformly disperse fine inert particles into a coating film and coarse protrusions are liable to be formed by agglomerated particles. The agglomerated particles are more readily shaved off through their contact with various guide rolls in the process of film formation in comparison with monodisperse particles, are adhered and accumulated on a base film as protrusions, and cause a drop out when the film is made into a magnetic tape. Although they are excellent in dispersibility in a coating film when observed from a microscopic field of view, the number of drop outs in the magnetic tape increases if coarse agglomerated particles are present when observed from a macroscopic field of view.

Generally, since inorganic particles have excellent hardness and are rarely deformed, they are excellent in a cleaning property for a magnetic head and it is easy to produce fine particles having different sizes. However, the particles have poor affinity with a polymer and are liable to fall off from the film. On the other hand, organic particles have excellent affinity with a polymer, but they have lower hardness than inorganic particles and hence, are deformed by heat or mechanical friction. Therefore, the electromagnetic conversion characteristics of a tape containing the organic particles deteriorate when the tape runs repeatedly.

It is therefore an object of the present invention to provide a laminate film provided with a film layer having characteristic features in the type of particles contained therein, the relationship between the size of particles contained therein and the thickness of the film, and a surface structure.

It is another object of the present invention to provide a laminate film which is excellent in abrasion resistance, wind-up property and handling properties in the process of film formation.

It is still another object of the present invention to provide a laminate film which gives a thin vapor-deposited metal film magnetic recording medium and an ultra thin layer coated magnetic recording medium which are excellent in electromagnetic conversion characteristics, drop out characteristics, running property of a magnetic layer and durability.

It is a further object of the present invention to provide a magnetic recording medium having the above characteristic features of the present invention.

Other objects and advantages of the present invention will become clear from the following description.

According to the present invention, the above objects and advantages of the present invention are firstly attained by a laminate film which comprises:

(A) a base layer comprising a thermoplastic resin; and (B) a first film layer which is present on at least one side of the base layer and comprises core-shell particles, each consisting of a core and a shell, and a hydrophilic resin, the shell of the core-shell particle having a lower secondary transition point than the core, the core-shell particles having an average particle diameter of 5 to 100 nm, satisfying the following expressions (1) and (2) at the same time:

$$1.01 \leq d_B/dc_B \leq 3.0 \quad (1)$$

wherein $d_B$ is an average particle diameter (nm) of the core-shell particles and $dc_B$ is an average diameter (nm) of the cores of the core-shell particles, and $$0.05 \leq t_B/dc_B \leq 0.8 \quad (2)$$

wherein $t_B$ is a thickness (nm) of the first film layer and $dc_B$ is defined as above, and producing surface protrusions at a density of $1 \times 10^6$ to $1 \times 10^8/mm^2$ on the surface of the first film layer, and the number of protrusions having a height of not smaller than 0.5 μm being not more than $0.5/mm^2$.

The thermoplastic resin constituting the base layer of the laminate film of the present invention is, for example, a polyester resin, polyamide resin, polyimide resin, polyether resin, polyether resin, polycarbonate resin, polyvinyl resin, polyolefin resin or the like. Of these, the thermoplastic resin is preferably a polyester resin or in particular, an aromatic polyester.

Preferred examples of the aromatic polyester include polyethylene terephthalate, polyethylene isophthalate, polytetramethylene terephthalate, poly-1,4-cyclohexylene dimethylene terephthalate, polyethylene-2,6-naphthalene dicarboxylate and the like. Of these, polyethylene terephthalate and polyethylene-2,6-naphthalene dicarboxylate are particularly preferred.

The above aromatic polyester may be either a homopolyester or copolyester. In the case of a copolyester, a copolymerizable component of polyethylene terephthalate and polyethylene-2,6-naphthalene dicarboxylate is diol components such as diethylene glycol, propylene glycol, neopentyl glycol, polyethylene glycol, p-xylene glycol or 1,4-cyclohexane dimethanol; other dicarboxylic acid components such as adipic acid, sebacic acid, phthalic acid, isophthalic acid, terephthalic acid (in the case of polyethylene-2,6-naphthalene dicarboxylate), 2,6-naphthalenedicarboxylic acid (in the case of polyethylene terephthalate), 5-sodium sulfoisophthalic acid, an oxycarboxylic acid component such as p-oxyethoxybenzoic acid; or the like. The copolymer proportion of the copolymerizable component is not more than 20 mol %, preferably not more than 10 mol %, based on either one of the dicarboxylic acid component and the diol component.

A polyfunctional compound having 3 or more functional groups, such as trimellitic acid or pyromellitic acid, may be further copolymerized. In this case, the polyfunctional compound may be copolymerized in an amount that the polymer is substantially linear, for example, not more than 2 mol %.

Further, the above aromatic polyester may be mixed with at least one of alkali metal salt derivatives of sulfonic acid which are non-reactive with the polyester, polyalkylene glycols which are substantially insoluble in the polyester and the like in an amount of not more than 5% by weight.

The base layer (A) comprising a thermoplastic resin may contain substantially no inert particles and may contain inert particles.

The base layer (A) containing substantially no inert particles does not contain externally added particles or internally added particles which produce protrusions on the film surface but may contain, in a small amount, for example, various small particles which may be sometimes produced by a catalyst required for the polymerization of a polyester and exhibit substantially no lubricant function. For example, the base layer can contain an antioxidant, thermal stabilizer, antistatic agent or the like which does not form surface protrusions.

The base layer (A) containing inert particles contains inert particles A which produce protrusions and exhibit a lubricant function.

Preferably, the inert particles A have an average particle diameter of not more than 400 nm, preferably 40 to 400 nm, a volume shape factor of 0.1 to π/6, and produce surface protrusions at a density of not more than $50,000/mm^2$, preferably 5,000 to $50,000/mm^2$ on the surface of the base layer.

If the average particle diameter of the inert particles A is less than 40 nm, the friction of the magnetic layer against a VTR head will be high, whereby the repetitive running durability of the magnetic layer and wind-up property in the process of film formation will deteriorate easily. If the average particle diameter is more than 400 nm, the electromagnetic conversion characteristics of a high-density magnetic recording medium will be damaged easily. On the other hand, if the density is more than $50,000/mm^2$, the electromagnetic conversion characteristics of a high-density magnetic recording medium will also be damaged easily. Further, the shape of the inert particle A must have a volume shape factor f of 0.1 to π/6 defined by the following equation.

$$f = V/d_A^3$$

wherein V is a volume of fine particles and $d_A$ is an average particle diameter of the fine particles. If the inert particle is a leaf-like particle having an f of less than 0.1, the magnetic properties of a thin film magnetic layer will deteriorate easily.

The average particle diameter of the inert particles A is more preferably 50 to 200 nm, particularly preferably 60 to 120 nm.

The volume shape factor of the inert particle A is more preferably 0.3 to π/6, particularly preferably 0.4 to π/6, at which the inert particle is substantially a sphere or elliptical sphere like a rugby ball.

Further, the density of protrusions on the surface is more preferably 7,500 to 40,000/mm$^2$, particularly preferably 10,000 to 30,000/mm$^2$.

Illustrative examples of the inert particle A include fine particles of heat resistant organic polymers such as crosslinked silicone resin, crosslinked polystyrene, crosslinked styrene-divinyl benzene copolymer, polymethyl methacrylate, methyl methacrylate copolymer, crosslinked methyl methacrylate copolymer, polytetrafluoroethylene, polyvinylidene fluoride, polyacrylonitrile and benzoguanamine resin; and fine particles of inorganic compounds such as silica, alumina, titanium dioxide, kaolin, talc, graphite, calcium carbonate, feldspar, molybdenum disulfide, carbon black and barium sulfate.

The first film layer of the laminate film of the present invention comprises core-shell particles, each consisting of a core and a shell, and a hydrophilic resin.

The hydrophilic resin refers to water-soluble organic resins and water-dispersible organic resins. Illustrative examples of the hydrophilic resin include aqueous alkyd resins, phenol resins, epoxy resins, amino resins, polyurethane resins, vinyl acetate resins, vinyl chloride-vinyl acetate copolymers and the like. From points of view of adhesion to the base layer (A), protrusion retaining property and slipperiness, hydrophilic acrylic resins, polyester resins and acryl-polyester resins are particularly preferred. These hydrophilic resins may be homopolymers, copolymers or mixtures thereof.

Of these, the hydrophilic acrylic resins include, for example, acrylic acid esters (in which alkyl groups of the ester groups include methyl, ethyl, n-propyl, isopropyl, n-butyl, isobutyl, t-butyl, 2-ethylhexyl, cyclohexyl, phenyl, benzyl, phenylethyl and the like); methacrylic acid esters (in which alkyl groups of the ester groups are the same as above); hydroxy-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-methylmethacrylamide, N-methylacrylamide, N-methylolacrylamide, N-methylolmethacrylamide, N,N-dimethylolacrylamide, N-methoxymethylacrylamide, N-methoxymethylmethacrylamide and N-phenylacrylamide; amino group-containing monomers such as N,N-diethylaminoethyl acrylate and N,N-diethylaminoethyl methacrylate; epoxy group-containing monomers such as glycidyl acrylate, glycidyl methacrylate and acrylglycidyl ether; monomers containing a sulfonic acid group or salts thereof such as styrenesulfonic acid, vinylsulfonic acid and salts thereof (such as salts of sodium, potassium and ammonium); monomers containing a carboxyl group or salts thereof such as crotonic acid, itaconic acid, acrylic acid, maleic acid, fumaric acid and salts thereof (such as salts of sodium, potassium and ammonium); monomers containing anhydrides such as maleic anhydride and itaconic anhydride; and copolymers produced from a combination of monomers such as vinyl isocyanate, aryl isocyanate, styrene, vinyl methyl ether, vinyl ethyl ether, vinyltrisalkoxysilane, alkyl maleic acid monoester; alkyl fumaric acid monoester, acrylonitrile, methacrylonitrile, alkyl itaconic acid monoester, vinylidene chloride, vinyl acetate and vinyl chloride. Of these, those containing not less than 50 mol % of a (meth)acrylic monomer component such as an acrylic acid derivative or a methacrylic acid derivative are preferred and those containing a methyl methacrylate component are particularly preferred.

The hydrophilic acrylic resin can be self-crosslinked with a functional group contained in its molecule or crosslinked using a crosslinking agent such as a melamine resin or an epoxy compound.

The hydrophilic polyester resin is a polyester containing, as an acid component, a polyvalent carboxylic acid such as terephthalic acid, isophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, trimellitic anhydride, phthalic anhydride, p-hydroxybenzoic acid, monopotassium salt of trimellitic acid or the like and a polyester containing, as a hydroxy compound component, a polyvalent hydroxy compound such as ethylene glycol, propylene glycol, 1,3-propane diol, 1,4-butane diol, 1,6-hexane diol, neopentyl glycol, 1,4-cyclohexane dimethanol, p-xylylene glycol, addition product of bisphenol A with ethylene oxide, diethylene glycol, triethylene glycol, polyethylene oxide glycol, polytetramethylene oxide glycol, dimethylolpropionic acid, glycerine, trimethylolpropane, dimethylolethyl sodium sulfonate or dimethylol potassium propanate. The polyester resin can be produced from these compounds by a commonly used method. To produce an aqueous coating, an aqueous polyester resin containing a 5-sodium sulfoisophthalic acid component or a carboxylic acid salt group is preferably used. The polyester resin can be self-crosslinked with a functional group contained in the molecule or crosslinked using a curing agent such as a melamine resin or epoxy resin.

Further, the hydrophilic acryl-polyester resin refers to acryl modified polyester resins or polyester modified acrylic resins in which an acrylic resin component and a polyester resin component are bonded to each other. They may be of either a graft type or a block type. The acryl-polyester resin can be produced, for example, by adding a radical initiator to both terminals of a polyester resin to polymerize an acrylic monomer, by adding a radical initiator to a side chain of a polyester resin to polymerize an acrylic monomer, or by adding a hydroxyl group to a side chain of an acrylic resin and reacting it with a polyester having an isocyanate group or carboxyl group at terminals to produce a comb-shaped polymer.

The shell of the core-shell particle consisting of a core and a shell has a lower secondary transition point and softer than the core. Although the compositions of the core and the shell may change continuously in a radial direction, the exterior of the shell and the center of the core distinctly differ from each other in secondary transition point.

The core-shell particle has the property of fixing to the base layer (A) when the shell portion of the core-shell particle reacts with the base layer after it is coated as the first film layer on the base layer (A) or when it reacts, melts and softens or deforms after a heat treatment is carried out after coating. On the other hand, the core portion is presumed to serve as a particle for providing appropriate slipperiness to a film and the optimum spacing from a magnetic head together with the shell portion. From a viewpoint of function division between the shell portion and the core portion, it is preferred that the shell portion should have excellent affinity with a film base portion and appropriate physical, chemical and thermal characteristics at film formation and heat treatment temperatures and the core portion should not be deformed by mechanical friction or the like and have a relatively larger hardness than the shell portion or the base layer film.

The material of the core portion of the core-shell particle is selected from organic materials such as polystyrene, polystyrene-divinylbenzene, polymethyl methacrylate, methyl methacrylate copolymer, methyl methacrylate crosslinked copolymer, polytetrafluoroethylene, polyvinylidene fluoride, polyacrylonitrile and benzoguanamine resin; and inorganic materials such as silica, alumina, titanium dioxide, kaolin, talc, graphite, calcium carbonate, feldspar, molybdenum disulfide, carbon black and barium sulfate.

The material of the shell portion is preferably selected from, for example, thermoplastic resins, particularly preferably acrylic resins and polyester resins. Particularly preferred are ones having a functional group having reactivity or affinity with the base layer (A), such as a carboxyl group, hydroxyl group, glycidyl group, amide group, epoxy group, isocyanate group or the like, which is introduced into the molecule in a desired proportion to improve affinity with the base layer (A). These functional groups may be used alone or in combination of two or more as the case may be. The glass transition temperature (to be abbreviated as Tg hereinafter) of the shell portion is preferably not higher than 80° C., more preferably not higher than 20° C. If Tg is higher than 80° C., the core-shell particles will fall off from the film markedly.

The core-shell particles have an average particle diameter of 5 to 100 nm. If the average particle diameter is smaller than 5 nm, the slipperiness and abrasion resistance of a film will become deteriorated and a blocking phenomenon will occur when the film is rolled. On the other hand, if the average particle diameter is larger than 100 nm, the particles will fall off from the film and the abrasion resistance of the film will become deteriorated. Further, spacing between the film and the magnetic head will be large, thereby making it difficult to provide a high-density recording medium.

Preferably, the core-shell particles have an average particle diameter of 10 to 50 nm and a nearly monodisperse particle size distribution.

The following relational expression (1) is established between the average particle diameter $d_B$ (nm) of the core-shell particles and the average particle diameter $dc_B$ (nm) of the core portions.

$$1.01 \leq d_B/dc_B \leq 3.0 \qquad (1)$$

If this ratio ($d_B/dc_B$) is more than 3.0, the core-shell particle will have a strong property like an organic particle having no multi-layer structure and consisting of only a shell portion and consequently, will be greatly deformed by heat or mechanical friction. On the other hand, if the ratio is less than 1.01, the core-shell particle will have a strong property like an inorganic particle, i.e., a low adhesion to a film, an increase in the number of the particles falling off from the film, and an increase in agglomerate rate. In either case, the processability of the film and the performance of a magnetic tape will be affected disadvantageously.

The relational expression is preferably $$1.02 \leq d_B/dc_B \leq 2.0,$$

more preferably $$1.04 \leq d_B/dc_B \leq 1.5.$$

Further, the core-shell particles contained in the first film layer (B) preferably have an agglomeration rate of not more than 10%, more preferably not more than 5%. If the agglomerate rate is more than 10%, agglomerates of the particles will produce abnormally coarse protrusions and the particles are liable to fall off from a film, thereby exerting an adverse effect on the performance of a magnetic tape.

Moreover, the following relational expression (2) is established between the average particle diameter $dc_B$ (nm) of the core portions of the core-shell particles and the thickness $t_B$ (nm) of the first film layer (B).

$$0.05 \leq t_B/dc_B \leq 0.8 \qquad (2)$$

If this ratio ($t_B/dc_B$) is more than 0.8, the protrusion-forming function of the core-shell particles will lower and the running durability of a magnetic recording medium formed therefrom will be insufficient. If the ratio is less than 0.05, the running durability will be insufficient because the particles will be shaved off by their contact with a guide roll in the process of film formation or the fallen particles will be adhered and accumulated on the film, thereby increasing the number of drop outs.

The relational expression is preferably $$0.08 \leq t_B/dc_B \leq 0.6,$$

more preferably $$0.1 \leq t_B/dc_B \geq 0.5.$$

Preferably, the core-shell particles produce protrusions on the surface of the first film layer at a density of $1 \times 10^6$ to $1 \times 10^8/mm^2$. If this density is less than $1 \times 10^6/mm^2$, the running durability of a magnetic recording medium produced therefrom will be unsatisfactory. If the density is more than $1 \times 10^8/mm^2$, the electromagnetic conversion characteristics will be adversely affected. The density is preferably $2 \times 10^6$ to $5 \times 10^7/mm^2$, more preferably $3.0 \times 10^6$ to $3.0 \times 10^7/mm^2$.

Of the above surface protrusions, the number of protrusions having a height of not smaller than 0.5 $\mu$m is not more than 0.5/mm$^2$. If the number of protrusions having a height of not smaller than 0.5 $\mu$m is more than 0.5/mm$^2$, the drop out of the film will become marked, causing a problem in practical application. The number of protrusions having a height of not smaller than 0.5 $\mu$m is preferably not more than 0.25/mm$^2$.

The core-shell particle can be produced by emulsion polymerizing the polymerizable monomer of the shell portion to coat the particle surface of the core portion in a system where the particle of the core portion is present.

In the laminate film of the present invention, the first film layer is present on at least one side of the base layer, that is, only one side or both sides of the base layer.

The first film layer is formed by applying an coating solution, preferably an aqueous coating solution, containing the core-shell particles and the hydrophilic resin onto at least one side of the base layer film and drying the coating. The solid content of the coating solution is 0.2 to 10% by weight, preferably 0.5 to 5% by weight, particularly preferably 0.7 to 3% by weight. This coating solution, preferably the aqueous coating solution, may be mixed with other components such as a surfactant, stabilizer, dispersant, UV absorber and thickening agent as required within limits not prejudicial to the effect of the present invention.

Coating is carried out on the thermoplastic resin film as the base layer before final stretching. After coating, the film is preferably stretched in at least one axial direction. The coating film is dried before or during this stretching. Coating is preferably carried out on an unstretched thermoplastic resin film or a longitudinally (monoaxially) stretched thermoplastic resin film. The coating method is not particularly limited but is preferably roll coating, die coating or the like.

The agglomeration rate of particles in the first film layer, particularly, the density of the agglomerated particles having a high agglomeration rate, is greatly improved compared with the case where conventional inorganic or organic particles are used when the core-shell particles are contained in the first film layer. The conceivable reasons for this are an increase in repulsive force between particles due to potential changes on the surfaces of the particles, changes in stable pH range, and the like.

Preferably, the first film layer has a surface roughness that satisfies the following expressions (3) and (4).

$$0.3 \leq ARa_B \leq 5.0 \quad (3)$$

wherein $ARa_B$ is a center line surface roughness (nm).

$$10 \leq ARz_B \leq 100 \quad (4)$$

wherein $ARz_B$ is a 10-points average roughness (nm).

If $ARa_B$ is more than 5.0 nm or $ARz_B$ is more than 100 nm, the electromagnetic conversion characteristics of a thin metal film magnetic recording medium in particular are liable to deteriorate. If $ARa_B$ is less than 0.3 nm or $ARz_B$ (nm) is less than 10 nm, slipperiness will lower excessively with the result that running durability will be insufficient or the first film layer will stick to a magnetic heat, thereby making noise. As a result, the film cannot be put to practical use.

$ARa_B$ is preferably in the range of 0.5 to 4.0 nm, more preferably 0.7 to 2.5 nm.

$ARz_B$ is preferably in the range of 15 to 70 nm, more preferably 20 to 40 nm.

When the laminate film of the present invention has the first film layer on only one side of the base layer (A), a second film layer containing inert particles C can be present on the other side of the base layer (A). The second film layer contributes to the improvement of wind-up property of the laminate film.

The second film layer may be formed by coating or by co-extrusion method which will be described hereinafter. When the second film layer is formed by coating, the inert particles C contained in the coating layer may be particles having the same size or particles having two or more different sizes. The average diameter of the particles is preferably 20 to 200 nm.

The content of the inert particles C is preferably 1 to 50% by weight. If the average particle diameter of the inert particles C is less than 20 nm or the content of the inert particles C is less than 1% by weight, the resulting film will be unsatisfactory in terms of film wind-up property and transportability in the process of film formation, and a blocking phenomenon will occur easily. On the other hand, if the average particle diameter is more than 200 nm, the particles will fall off from the film easily. If the content of the inert particles C contained in the second film layer is more than 50% by weight, the second film layer itself will have a lowered strength and will have a poor abrasion resistance.

The average particle diameter of the inert particles C is more preferably 30 to 100 nm and the content thereof is more preferably 3 to 50% by weight, particularly preferably 5 to 30% by weight.

The material of the inert particles C is selected from, for example, organic materials such as polystyrene, polystyrene-divinyl benzene, polymethyl methacrylate, methyl methacrylate copolymer, methyl methacrylate crosslinked copolymer, polytetrafluoroethylene, polyvinylidene fluoride, polyacrylonitrile and benzoguanamine resin; and inorganic materials such as silica, alumina, titanium dioxide, kaolin, talc, graphite, calcium carbonate, feldspar, molybdenum disulfide, carbon black and barium sulfate. Alternatively, the inert particles C may be the shell-core particles used in the first film layer.

As a resin for forming the coating layer containing inert particles C, the same examples as those for the aqueous resin used in the formation of the first film layer are given. They may further contain a cellulose resin.

When the second film layer is formed by co-extrusion, the inert particles C contained therein may be particles having the same size or two or more different sizes. The average diameter of the particles is preferably 0.1 to 1 µm. In this case, the content of the inert particles C is preferably 0.001 to 5.0% by weight. If the average particle diameter is less than 0.1 µm or the content is less than 0.001% by weight, the resulting film will be unsatisfactory in terms of film wind-up property and transportability in the process of film formation, and a blocking will occur easily. If the average particle diameter is more than 1 µm or the content is more than 5.0% by weight, the effect of particles' pushing up the surface of the first film layer will be large, thereby deteriorating the electromagnetic conversion characteristics of a magnetic film. As the inert particles C, the same particles as those used when the second film layer is formed by coating can be used.

The average particle diameter of the inert particles C is more preferably 0.1 to 0.5 µm and the content thereof is more preferably 0.005 to 1.0% by weight.

The laminate film of the present invention can be produced by a conventionally known method or a method which is accumulated by those skilled in the art.

For example, a laminate film having a base layer comprising a biaxially oriented polyester film is produced as follows. In the case of coating, the above-described thermoplastic resin is first extruded into a film from a die at a temperature of a melting temperature Tm°C. to (Tm+70)°C., quenched and solidified at 40 to 90° C. to obtain an unstretched film. Thereafter, the unstretched film is stretched to 2.5 to 8.0 times, preferably 3.0 to 7.5 times, in a monoaxial direction (in longitudinal or transverse direction) at a temperature of (Tg−10) to (Tg+70)°C. (Tg: glass transition temperature of polyester) by a commonly used method and then coating solutions for forming the first and second film layers are applied to the respective sides of the film. The coated film is then stretched to 2.5 to 8.0 times, preferably 3.0 to 7.5 times, in a direction perpendicular to the above direction at a temperature of Tg to (Tg+70)°C. Further, the biaxially oriented film may be re-stretched in a longitudinal and/or transverse direction as required. That is, 2-, 3-, 4- or multi-stage stretching may be carried out. The total stretch ratio is generally 9 times or more, preferably 12 to 35 times, more preferably 15 to 26 times in terms of area stretch ratio. Subsequently, the biaxially oriented film is heat-set at a temperature of (Tg+70) to (Tm−10)°C., for example, 170 to 250° C. and crystallized to be provided with excellent dimensional stability. The heat-setting time is preferably 1 to 60 sec.

In the case of co-extrusion, two different thermoplastic resins for forming the base layer and the second film layer are placed one upon the other and laminated together in a molten state within an extruder or before the extruder die (the former is generally called "a multi-manifold system" and the latter "a feed block system") and coextruded in an appropriate thickness ratio to obtain a double-layer unstretched film. Coating is carried out after monoaxial stretching in the same manner as the above-described coating method except that a coating solution for forming the first film layer is applied. With this method, a biaxially oriented laminate polyester film having good adhesion between layers is obtained.

In the production of a laminate film, the thermoplastic resin may be added with additives other than the above inert particles, such as a stabilizer, colorant and an agent for adjusting the resistivity of a molten polymer as required.

Preferably, the laminate film of the present invention has a thickness of 2.5 to 20 $\mu$m, for example.

The laminate film of the present invention is advantageously used as a base film for a magnetic recording medium. In this case, a magnetic layer is formed on the first film layer of the laminate film of the present invention. The magnetic layer may be a thin metal film magnetic layer or a coated magnetic layer.

A magnetic recording medium comprising the laminate film of the present invention and a thin metal film magnetic layer present on the first film layer of the laminate film can be obtained by forming a thin ferromagnetic metal film layer comprising iron, cobalt, chromium, an alloy thereof or an oxide thereof on the surface of the first film layer by means of a vacuum vapor deposition, sputtering, ion plating or the like, a protective layer composed comprising a diamond-like carbon (DLC) or the like and a fluorine-containing carboxylic acid-based lubricant layer sequentially on the surface of the thin ferromagnetic metal film layer as required according to purpose and application, and further a known back-coat layer on the surface of the base layer A or the second film layer as a deposited magnetic recording medium for high-density recording having excellent in output characteristics at a short-wavelength range and electromagnetic conversion characteristics such as S/N and C/N, few drop outs and a small error rate. This deposited electromagnetic recording medium is extremely useful as a tape medium for analog signal recording Hi8, digital video cassette recorders (DVC), data 8 mm and DDSIV for digital signal recording.

A magnetic recording medium comprising the laminate film of the present invention and a coated magnetic layer present on the first film layer of the laminate film can be obtained as a metal coated magnetic recording medium for high-density recording having excellent in output at a short wavelength range and electromagnetic conversion characteristics such as S/N and C/N, few drop outs and a small error rate by uniformly dispersing needle-shaped ultrafine magnetic powders of iron or containing iron as a main component into a binder such as vinyl chloride, vinyl chloride-vinyl acetate copolymer or the like, applying the binder to the surface of the first film layer to ensure that the thickness of a magnetic layer is not larger than 1 $\mu$m, preferably 0.1 to 1 $\mu$m, and further forming a back-coat layer on the surface of the base layer A or the second film layer by a known method. As required, titanium oxide fine particles may be dispersed into the same organic binder as that for the magnetic layer and this binder may be applied to the surface of the first film layer to form a non-magnetic layer as a layer underlying the metal powder-containing magnetic layer. This metal coated magnetic recording medium is extremely useful as a tape medium for 8 mm video, Hi8, $\beta$-cam SP and W-VHS for analog signal recording and for digital video cassette recorders (DVC), data 8 mm, DDSIV, digital $\beta$-cam, D2, D3 and SX for digital signal recording.

From the laminate film of the present invention, there can be obtained a coated magnetic recording medium for high-density recording having excellent in output at a short wavelength range and electromagnetic conversion characteristics such as S/N and C/N, few drop outs and a small error rate by uniformly dispersing needle-shaped ultrafine magnetic powders such as iron oxide or chromium oxide or lamellar ultrafine magnetic powders such as barium ferrite into a binder such as vinyl chloride, vinyl chloride-vinyl acetate copolymer or the like, applying the binder to the surface of the first film layer to ensure that the thickness of a magnetic layer is not larger than 1 $\mu$m, preferably 0.1 to 1 $\mu$m, and further forming a back-coat layer on the base layer or the second film layer by a known method. As required, titanium oxide ultrafine particles may be dispersed into the same organic binder as that for the magnetic layer and this binder may be applied to the surface of the first film layer to form a non-magnetic layer as a layer underlying the metal powder-containing magnetic layer. This oxide coated magnetic recording medium is useful as a high-density oxide coated magnetic recording medium for QIC for data streamers for digital signal recording.

The above-described W-VHS is a VTR for analog HTDV signal recording and DVC can be used for HDTV signal recording. It can be said that the laminate film of the present invention is a base film extremely useful for a magnetic recording medium for these VTRs applicable to HDTV signals.

The following examples are given to further illustrate the present invention. Measurement methods used in the present invention are as follows.

(1) average particle diameter I of particles (average particle diameter: not smaller than 0.06 $\mu$m)

This is measured using a CPU-50 model centrifugal particle size analyzer of Shimadzu Corporation. A particle diameter, "equivalent spherical diameter" equivalent to 50% by weight, is read from a cumulative curve of the particles of each diameter and the amount thereof calculated based on the obtained centrifugal sedimentation curve, and taken as the average particle diameter (refer to "Book of Particle Size Measurement Technology" issued by Nikkan Kogyo Press, pp. 242–247, 1975).

(2) average particle diameter II of particles (average particle diameter: less than 0.06 $\mu$m)

Particles having an average particle diameter smaller than 0.06 $\mu$m which form small protrusions are measured by a light scattering method. That is, it is expressed by the "equivalent spherical diameter" of the particles which correspond to the particle size at the point of 50% by weight of the total of all particles obtained by the NICOMP Model 270 submicron particle sizer of Nicomp Instruments Inc.

(3) Volume shape factor f

A photo of each particle is taken with a magnification for each size by a scanning electron microscope and the maximum diameter of a projected plane and the volume of the particle are calculated from the photo using a Luzex 500 image analyzer of Nippon Regulator Co. Ltd. and the volume shape factor f is calculated from the following expression.

$$f = V/d^3$$

wherein f is a volume shape factor, V is a volume ($\mu$m$^3$) of the particle and d is the maximum diameter ($\mu$m) of the projected plane.

(4) layer thickness and particle diameter of core portion of core-shell particle The thickness of a film is measured at 10 locations of the film at random by a micrometer, and an average value of the measurement values is taken as the total thickness of the film. The thickness of a thin layer is measured by the following method, while the thickness of a thick layer is obtained by subtracting the thickness of the thin layer from the total thickness. That is, using a secondary ion mass spectrometer (SIMS), the concentration ratio ($M^+/C^+$) of an element ($M^+$) that is derived from particles having the highest concentration out of the particles contained in the film present in the range of from the surface layer to a depth of 5,000 nm, to the carbon element ($C^+$) of a polyester is taken as a particle concentration, and a portion from the surface up to a depth of 5,000 nm is analyzed in the thickness direction. In the vicinity of the surface of the layer, the particle concentration is measured to be low but becomes higher as the distance of the measured point from the surface increases. In the case of the present invention, there are two cases, that is, one case is a case where after the particle concentration becomes a stable value 1, it increases or decreases to a stable value 2, and the other is a case where after the particle concentration becomes a stable value 1, it decreases continuously. Based on this distribution curve, in the former case, a depth which provides a particle concentration of (stable value 1+stable value 2)/2 is taken as the thickness of the layer whereas in the latter case, a depth that provides a particle concentration of one-half of the stable value 1 (deeper than the depth that gives a stable value 1) is taken as the thickness of the layer.

Measurement conditions are as follows.

(1) measurement instrument secondary ion mass spectrometer (SIMS): 6300 of PERKIN ELMER Co.

(2) measurement conditions species of primary ion: $O_2^+$
acceleration voltage of primary ions: 12 kV
primary ion current: 200 nA
luster area: 400 µm □
analysis area: gate 30%
measurement degree of vacuum: $6.0 \times 10^{-9}$ Torr
E-GUNN: 0.5 kV-3.0 A In the case where the most of particles contained in an area of from the surface layer to a depth of 5,000 nm are organic polymer particles other than a silicone resin, it is difficult to measure them with SIMS. Therefore, a concentration distribution curve similar to the above is measured by FT-IR (Fourier transform infrared spectrometry) or XPS (X-ray photo-electron spectrometry) to obtain a thickness of the layer while the film is etched little by little from the surface.

The above measurement method is very effective in the case of a coextruded layer. In the case of a coating layer, a film piece is fixed by an epoxy resin and molded to prepare an ultrathin piece (by cutting the film in a flow direction) having a thickness of about 60 nm by a microtome. This sample is observed by a transmission electron microscope (H-800 of Hitachi, Ltd.) to obtain the thickness of the layer from the interface of the layer. The diameter of the core portion of a core-shell particle is obtained by observing the section of this ultrathin piece.

(5) AFM surface roughness ARa and ARz

Using the J scanner of the Nano Scope III atomic force microscope (AFM) of Digital Instruments Co., ARa (square average roughness) and ARz (10-points average roughness) calculated under the following conditions are measured.

probe: single bond silicon sensor
scanning mode: tapping mode
scanning area: 2 µm×2 µm
number of pixels: 256×256 data points
scanning rate: 2.0 Hz
measurement environment: room temperature, in the air (6) number of particle protrusions and agglomeration rate Using a SEM (the T-300 scanning electron microscope of JEOL Corp.), 20 photos of the surface of a laminate film are taken at a magnification of 5,000× or 30,000× at an angle of 0° to count the number of particle protrusions and an average value thereof is calculated as the number of protrusions per 1 mm². The agglomeration rate is calculated from the following equation using the same SEM photos.

agglomeration rate (%)=[(total number of agglomerates of two or more particles)/(total number of agglomerates of one or more particles)]×100

(7) height and density of protrusions produced by coarse agglomerates

A thin aluminum film is formed on a first film layer of a laminate film to a thickness of 0.2 µm from an inclination angle of 45° by a vacuum deposition method and a 1 cm² area of the film is observed by a transmission microscope at a magnification of 400× to count the number of transmitted lights having the maximum length (corresponding to the height of a protrusion) of a non-evaporated portion, generated by the shade of the projection, of 0.2 mm or more. (The density of protrusions produced by coarse agglomerates having a height of 0.2 mm/400=0.5 µm or more is measured.)

(8) abrasion resistance

A film is cut into a size of 25 to 30-cm long and ½-inch wide to prepare a sample and a laser blade is applied to the surface of a first film layer of the sample at an angle of 90° and a depth of 0.5 mm. When the sample is caused to run under a load of 500 g/0.5 inch at a rate of 6.7 cm/sec, the width of shaving powders adhered to the laser blade in a depth direction is obtained by a photomicrograph (160 magnifications). When the width of the shaving powders in a depth direction is not more than 3 µm, abrasion resistance is evaluated as ⊚, when the width is 3 to 5 µm, abrasion resistance is evaluated as ○, and when the width is not less than 5 µm, abrasion resistance is evaluated as X. The smaller the width of the shaving powders in a depth direction, the better the abrasion resistance is.

(9) wind-up property

After wind-up conditions at the time of slitting are optimized, a 560 mm wide and 9,000 m long film is slit and rolled into 10 rolls which are then left for 1 week. The wind-up property of the rolls is evaluated based on the following criteria from the number of rolls which can be commercialized judged from the state of occurrence of film wrinkles.

| number of non-defective rolls | evaluation |
| --- | --- |
| 8 or more | ⊚ |
| 5 to 7 | ○ |
| 3 to 4 | X |
| 2 or less | X X |

(10) production of magnetic tape and evaluation of characteristics

Two 100% cobalt ferromagnetic thin film layers are formed on the surface of the first film layer of a laminate film to a total thickness of 0.2 µm (each layer has a thickness of about 0.1 µm) by a vapor deposition method. A diamond-like carbon (DLC) film layer and a fluorine-containing carboxylic acid-based lubricant layer are formed sequentially on the above surface of the thin film layers, and a back coat layer is further formed on the surface of a thermoplastic resin A or a second film layer by a known method. Thereafter, the resulting laminate is slit into a 8 mm wide tape which is then loaded into a commercial 8 mm video cassette. Then, the characteristics of this tape are measured using the following commercial measurement instruments.

Instruments used 8 mm video tape recorder: EDV-6000 of Sony Corporation

C/N measurement: noise meter of Shibasoku Co., Ltd.

(1) C/N measurement

A signal having a recording wavelength of 0.5 μm (frequency of about 7.4 MHz) is recorded, the ratio of values of its reproduced signal at 6.4 MHz and 7.4 MHz is taken as the C/N of the tape which is expressed as a relative value when the C/N of a deposited tape for a commercial 8 mm video is 0 dB.

⊚: +2 dB or more
○: −1 to +2 dB
X: −4 to −2 dB
X X: −4 dB or less (2) drop out (D/O) measurement Using a drop out counter, the number of drop outs per 1 minute is counted at 15 μs/18 dB.

⊚: more than 0 to not more than 10/min
○: more than 10 to not more than 20/min
X: more than 20 to not more than 50/min
X X: 50/min or more (3) running durability The C/N is measured after recording/reproduction are repeated 500 times at a tape running rate of 85 cm/min at 40° C. and 80% RH, and a deviation from the initial value is evaluated based on the following criteria.

⊚: +0.03 $d_B$ or more based on the initial value
○: −1.0 to +0.0 dB based on the initial value
X: less than −1.0 dB based on the initial value

(11) secondary transition point (Tg)

In accordance with JIS K7121, this is measured using the DSC 220 Model of Seiko Instruments Inc. The measurement conditions are as follows. That is, 10 mg of a sample is set in the above device and molten at a temperature of 330° C. for 5 minutes and quenched. The temperature of this sample is elevated at a rate of 20° C./min to detect its secondary transition point (Tg).

Tg's of the core portion and the shell portion of the core-shell particle are measured using separately prepared inert particles composed of only a core portion and only a shell portion.

EXAMPLE 1

Dimethyl terephthalate and ethylene glycol were polymerized by adding manganese acetate as an ester exchange catalyst, antimony trioxide as a polymerization catalyst, phosphorous acid as a stabilizer and inert particles shown in Table 1 as a lubricant by a commonly used method to obtain polyethylene terephthalate (PET).

This polyethylene terephthalate was dried at 70° C. for 3 hours, supplied to an extruder, molten at a temperature of 280 to 300° C., extruded into a sheet from a die and quenched to obtain a 84 μm-thick unstretched film.

The obtained unstretched film was preheated, stretched to 3.2 times in a longitudinal direction between high-speed and low-speed rolls at a film temperature of 95° C., quenched and then, coated with an aqueous coating solution containing a hydrophilic resin and particles B for a first film layer shown in Table 1 on one side to a thickness of 0.005 μm (after stretching and drying) and an aqueous solution containing a resin and particles C for a second film layer shown in Table 2 on the other side to a thickness of 0.015 μm. Thereafter, the resulting film was supplied to a stenter and stretched to 4.1 times in a transverse direction at 110° C. The thus obtained biaxially oriented film was heat-set with hot air heated at 220° C. for 4 seconds to obtain a biaxially oriented polyester laminate film having a thickness of 6.4 μm.

EXAMPLE 2 AND COMPARATIVE EXAMPLES 4, 7 AND 9

Biaxially oriented polyester laminate films were obtained in the same manner as in Example 1 except that the resins and particles of the first film layer and the second film layer and the thickness of the thermoplastic resin layer were changed as shown in Tables 1 and 2.

EXAMPLE 3 AND COMPARATIVE EXAMPLES 2 AND 6

Biaxially oriented polyester laminate films were obtained in the same manner as in Example 1 except that polyethylene terephthalates for the thermoplastic resin layer A and the second film layer shown in Tables 1 and 2 were supplied to two respective extruders and laminated together using a multi-manifold coextruding die, and the resulting laminate film was coated with an aqueous solution containing a hydrophilic resin and particles B for the first film layer shown in Table 1 on a side opposite to the second film layer.

EXAMPLES 4 AND 5 AND COMPARATIVE EXAMPLES 1, 3, 5, AND 10

Polyethylene-2,6-naphthalene dicarboxylates (PEN) were obtained in the same manner as in Example 1 except that the particles shown in Table 1 were used and the same molar amount of dimethyl 2,6-naphthalene dicarboxylate was used in place of dimethyl terephthalate.

The polyethylene-2,6-naphthalene dicarboxylates were dried at 170° C. for 6 hours to obtain unstretched films of examples and comparative examples in the same manner as in Example 1.

The obtained unstretched films were preheated, stretched to 3.6 times in a longitudinal direction between high-speed and low-speed rolls at a film temperature of 135° C., quenched, coated with aqueous coating solutions for the first and second film layers shown in Tables 1 and 2 in the same manner as in Example 1, supplied to a stenter and stretched to 6.0 times in a transverse direction at 155° C. The thus obtained biaxially oriented films were heat-set with hot air heated at 200° C. for 4 seconds to obtain biaxially oriented polyester laminate films.

EXAMPLE 6 AND COMPARATIVE EXAMPLE 8

Biaxially oriented polyester laminate films were obtained in the same manner as in Example 3 except that polyethylene-2,6-naphthalene dicarboxylates were used in place of polyethylene terephthalate as shown in Table 1.

The surface characteristics, the ratio $d_B/dc_B$ of the particle diameter $d_B$ of the core-shell particle to the particle diameter $dc_B$ of the core portion, the ratio $t_B/dc_B$ of the thickness $t_B$ of the first film layer to the particle diameter $dc_B$ of the core portion of the core-shell particle, abrasion resistance and wind-up property of the biaxially oriented laminate films obtained in the above Examples 1 to 6 and Comparative Examples 1 to 10 and the characteristics of ferromagnetic deposited magnetic film tapes formed from these films are shown in Table 3.

TABLE 1

| | First film layer | | | | | Thermoplastic resin layer A | | | | |
|---|---|---|---|---|---|---|---|---|---|---|
| | Inert particles B | | | | | | Inert particles A | | | |
| | Kind of resin | Coating material | Core material | Average particle diameter [nm] | Particle diameter of core portion [nm] | Kind of resin | Material | Volume shape factor | Average particle diameter [nm] | Density of protrusions [ /mm²] |
| Ex. 1 | A | Acryl copolymer | Polystyrene | 28 | 25 | PET | Silica | 0.5 | 60 | 25000 |
| Ex. 2 | A | Acryl copolymer | Silica | 37 | 30 | PET | Silicone | 0.5 | 100 | 30000 |
| Ex. 3 | B | Copolyester | Styrene/divinyl benzene copolymer | 25 | 15 | PET | Silica | 0.5 | 60 | 25000 |
| Ex. 4 | A | Copolyester | Silica | 50 | 37 | PEN | Calcium carbonate | 0.4 | 120 | 12000 |
| Ex. 5 | B | Acryl copolymer | Polystyrene | 28 | 25 | PEN | Silica | 0.5 | 80 | 10000 |
| Ex. 6 | B | Copolyester | Polystyrene | 44 | 40 | PEN | Silicone | 0.5 | 100 | 9000 |
| Comp. Ex. 1 | B | Acryl copolymer | Polystyrene | 220 | 200 | PEN | Silica | 0.5 | 60 | 15000 |
| Comp. Ex. 2 | A | Acryl copolymer | Polystyrene | 28 | 25 | PET | Silica | 0.5 | 60 | 1000 |
| Comp. Ex. 3 | B | — | Acryl copolymer | 40 | 40 | PEN | Silicone | 0.5 | 100 | 20000 |
| Comp. Ex. 4 | A | — | Silica | 22 | 22 | PET | Calcium carbonate | 0.4 | 120 | 20000 |
| Comp. Ex. 5 | B | Copolyester | Silica | 50 | 37 | PEN | Titanium oxide | 0.05 | 40 | 12000 |
| Comp. Ex. 6 | A | Acryl copolymer | Styrene/divinyl benzene copolymer | 68 | 60 | PET | Silica | 0.5 | 60 | 30000 |
| Comp. Ex. 7 | A | Acryl copolymer | Polystyrene | 50 | 12 | PET | Calcium carbonate | 0.4 | 120 | 22000 |
| Comp. Ex. 8 | A | Copolyester | Polystyrene | 45 | 40 | PEN | Silicone | 0.5 | 600 | 10000 |
| Comp. Ex. 9 | B | Acryl copolymer | Silica | 37 | 30 | PET | Silicone | 0.5 | 100 | 12000 |
| Comp. Ex. 10 | A | Acryl copolymer | Silica | 23 | 15 | PEN | Silica | 0.5 | 120 | 20000 |

Ex.: Example,
Comp. Ex.: Comparative Example
(Note) Kinds of resin of the first film layer
A: acryl modified polyester (IN-170-6 of Takamatsu Yushi K.K.),
B: copolyester (2,6-naphthalenedicarboxylic acid/isophthalic acid/5-sodium suofoisophthalic acid//ethylene glycol/addition product of bisphenol A with 2 moles of propylene oxide) = 90/5/5//70/30

TABLE 2

| | Second film layer | | | | | | | | |
|---|---|---|---|---|---|---|---|---|---|
| | Particles C having maximum average particle diameter | | | | Other particles | | Constitution of layer thickness | | |
| | Kind of resin | Material | Average particle diameter [nm] | Content [wt %] | Material | Average particle diameter [nm] | Content [wt %] | Layer B [μm] | Layer A [μm] | Layer C [μm] |
| Ex. 1 | C | Acryl | 40 | 10 | — | — | — | 0.007 | 6.4 | 0.020 |
| Ex. 2 | D | Silica | 50 | 25 | — | — | — | 0.010 | 9.8 | 0.035 |
| Ex. 3 | PET | Silica | 300 | 0.05 | Silica | 80 | 0.3 | 0.008 | 5.6 | 0.800 |
| Ex. 4 | C | Acryl | 40 | 15 | — | — | — | 0.005 | 4.8 | 0.015 |
| Ex. 5 | D | Silica | 60 | 5 | Silica | 20 | 15 | 0.006 | 4.6 | 0.030 |
| Ex. 6 | PEN | Silicone | 500 | 0.01 | θ Alumina | 300 | 0.2 | 0.009 | 5.3 | 0.600 |
| Comp. Ex. 1 | C | Acryl | 40 | 10 | — | — | — | 0.007 | 6.4 | 0.020 |
| Comp. Ex. 2 | PET | Silica | 300 | 0.05 | Silica | 80 | 0.3 | 0.008 | 5.6 | 0.800 |
| Comp. Ex. 3 | C | Acryl | 40 | 10 | — | — | — | 0.008 | 4.2 | 0.015 |
| Comp. Ex. 4 | C | Silica | 60 | 5 | Silica | 20 | 15 | 0.006 | 6.3 | 0.020 |
| Comp. Ex. 5 | D | Acryl | 40 | 15 | — | — | — | 0.005 | 4.8 | 0.015 |
| Comp. Ex. 6 | PET | Silica | 300 | 0.05 | Silica | 80 | 0.3 | 0.001 | 5.6 | 0.800 |
| Comp. Ex. 7 | C | Acryl | 40 | 10 | — | — | — | 0.004 | 7.5 | 0.015 |
| Comp. Ex. 8 | PEN | Silicone | 500 | 0.01 | θ Alumina | 300 | 0.2 | 0.010 | 4.0 | 0.600 |
| Comp. Ex. 9 | D | Silica | 50 | 25 | — | — | — | 0.010 | 9.8 | 0.035 |
| Comp. Ex. 10 | — | — | — | — | — | — | — | 0.005 | 5.7 | — |

Ex.: Example,
Comp. Ex.: Comparative Example
(Note) Kinds of resin of the second film layer
C: acryl modified polyester/methyl cellulose = 3/1
D: copolyester/methyl cellulose = 5/2

TABLE 3

| | Characteristics of first film layer | | | | | | | Characteristics of magnetic recording medium | | | | |
|---|---|---|---|---|---|---|---|---|---|---|---|---|
| | Density of protrusions [/mm²] | Coarse agglomerates [/mm²] | Agglomeration rate [%] | AFM roughness ARa_B [nm] | ARz_B [nm] | $d_B/dc_B$ | $t_B/dc_B$ | Film characteristics Abrasion resistance | Wind-up property | Electro-magnetic conversion characteristics C/N | D/O | Running durability |
|---|---|---|---|---|---|---|---|---|---|---|---|---|
| Ex. 1 | 200000 | 0.09 | 5.6 | 1.8 | 27 | 1.12 | 0.28 | ⊚ | ○ | ⊚ | ⊚ | ○ |
| Ex. 2 | 380000 | 0.16 | 7.2 | 2.1 | 32 | 1.23 | 0.33 | ○ | ⊚ | ○ | ○ | ⊚ |
| Ex. 3 | 520000 | 0.18 | 7.9 | 2.7 | 20 | 1.67 | 0.53 | ○ | ⊚ | ○ | ○ | ⊚ |
| Ex. 4 | 50000 | 0.05 | 1.1 | 1.9 | 43 | 1.35 | 0.14 | ○ | ⊚ | ○ | ⊚ | ⊚ |
| Ex. 5 | 170000 | 0.08 | 3.5 | 1.5 | 25 | 1.12 | 0.24 | ○ | ○ | ⊚ | ⊚ | ○ |
| Ex. 6 | 450000 | 0.12 | 7.6 | 3.0 | 41 | 1.10 | 0.23 | ○ | ⊚ | ○ | ○ | ⊚ |
| Comp. Ex. 1 | 120000 | 0.02 | 2.3 | 3.5 | 180 | 1.10 | 0.04 | × | ⊚ | ○ | × | ⊚ |
| Comp. Ex. 2 | 170000 | 0.10 | 4.6 | 1.9 | 24 | 1.12 | 0.32 | ○ | ○ | ⊚ | ○ | × |
| Comp. Ex. 3 | 250000 | 0.08 | 5.8 | 2.3 | 41 | 1.00 | 0.20 | ⊚ | ○ | ⊚ | ○ | × |
| Comp. Ex. 4 | 160000 | 1.50 | 31.5 | 1.5 | 23 | 1.00 | 0.27 | × | ⊚ | × | ×× | ○ |
| Comp. Ex. 5 | 70000 | 0.07 | 3.8 | 2.0 | 34 | 1.35 | 0.14 | ○ | ○ | × | ○ | ○ |
| Comp. Ex. 6 | 180000 | 0.12 | 5.5 | 3.1 | 70 | 1.13 | 0.02 | × | ⊚ | ○ | × | ⊚ |
| Comp. Ex. 7 | 90000 | 0.03 | 1.5 | 1.8 | 25 | 4.17 | 0.33 | ⊚ | ○ | ○ | ○ | × |
| Comp. Ex. 8 | 230000 | 0.06 | 6.1 | 2.6 | 38 | 1.13 | 0.25 | ○ | ⊚ | × | ○ | ⊚ |
| Comp. Ex. 9 | 5000 | 0 | 0.8 | 0.7 | 15 | 1.23 | 0.33 | ⊚ | ○ | ⊚ | ⊚ | × |
| Comp. Ex. 10 | 520000 | 0.13 | 8.2 | 2.9 | 20 | 1.53 | 0.33 | ○ | ×× | ○ | ○ | ○ |

Ex.: Example,
Comp. Ex.: Comparative Example

EXAMPLE 7

Dimethyl terephthalate and ethylene glycol were polymerized by adding manganese acetate as an ester exchange catalyst, antimony trioxide as a polymerization catalyst and phosphorous acid as a stabilizer by a commonly used method to obtain polyethylene terephthalate (PET) containing substantially no inert particles.

The polyethylene terephthalate was dried at 170° C. for 3 hours, supplied to an extruder, molten at 280 to 300° C., extruded into a sheet from a die and quenched to obtain a 82 μm-thick unstretched film.

The obtained unstretched film was preheated, stretched to 3.2 times in a longitudinal direction between high-speed and low-speed rolls at a film temperature of 95° C., quenched and coated with an aqueous coating solution containing a hydrophilic resin and particles B for the first film layer shown in Table 4 on one side to a thickness of 0.005 μm (after stretching and drying) and an aqueous coating solution containing a resin and particles C for the second film layer shown in Table 5 on the other side to a thickness of 0.015 μm. Thereafter, the coated film was supplied to a stenter and stretched to 4.1 times in a transverse direction at 110° C. The obtained biaxially oriented film was heat-set with hot air heated at 220° C. for 4 seconds to obtain a biaxially oriented polyester laminate film having a thickness of 5.9 μm.

EXAMPLE 8 AND COMPARATIVE EXAMPLES 11, 12, 15 AND 16

Biaxially oriented polyester laminate films were obtained in the same manner as in Example 7 except that the resins and particles of the first and second film layers and the thickness of the thermoplastic resin layer A were changed as shown in Tables 4 and 5.

EXAMPLE 9

Biaxially oriented polyester laminate films were obtained in the same manner as in Example 7 except that polyethylene terephthalates for the thermoplastic resin layer A and the second film layer shown in Tables 4 and 5 were supplied to two respective extruders and laminated together using a multi-manifold coextruding die, and the resulting laminates were coated with an aqueous coating solution containing a resin and particles for the first film layer shown in Table 4 on the side opposite to the second film layer.

EXAMPLES 10 AND 11 AND COMPARATIVE EXAMPLES 13 AND 17

Polyethylene-2,6-naphthalene dicarboxylates (PEN) were obtained in the same manner as in Example 7 except that particles shown in Tables 4 and 5 were used and the same molar amount of dimethyl 2,6-naphthalene dicarboxylate was used in place of dimethyl terephthalate.

The polyethylene-2,6-naphthalene dicarboxylates were dried at 170° C. for 6 hours to obtain unstretched films of examples and comparative examples in the same manner as in Example 7.

The obtained unstretched films were preheated, stretched to 3.6 times in a longitudinal direction between high-speed and low-speed rolls at a film temperature of 135° C., quenched, coated with aqueous coating solutions for the first and second film layers shown in Tables 4 and 5, supplied to a stenter and stretched to 6.0 times in a transverse direction at 155° C. The obtained biaxially oriented films were heat-set with hot air heated at 200° C. for 4 seconds to obtain biaxially oriented polyester laminate films.

EXAMPLE 12 AND COMPARATIVE EXAMPLES 14 AND 18

Biaxially oriented polyester laminate films were obtained in the same manner as in Example 9 except that polyethylene-2,6-naphthalene dicarboxylates were used as shown in Tables 4 and 5 in place of polyethylene terephthalate.

The surface characteristics, the ratio $d_B/dc_B$ of the particle diameter $d_B$ of the core-shell particle to the particle diameter $dc_B$ of the core portion, the ratio $t_B/dc_B$ of the thickness $t_B$ of the first film layer to the particle diameter $dc_B$ of the core portion of the core-shell particle, abrasion resistance and wind-up property of the biaxially oriented laminated films obtained in the above Examples 7 to 12 and Comparative Examples 11 to 18 and the characteristics of ferromagnetic deposited film tapes formed from these films are shown in Table 6.

TABLE 4

| | First film layer | | | | | | Thermoplastic resin layer A | | | |
|---|---|---|---|---|---|---|---|---|---|---|
| | Particles B | | | | | | | Particles A | | |
| | Kind of resin | Coating material | Core material | Volume shape factor | Average particle diameter [nm] | Particle diameter of core portion [nm] | Kind of resin | Material | Average particle diameter [nm] | Content [wt %] |
| Ex. 7 | A | Acryl copolymer | Polystyrene | 0.5 | 28 | 25 | PET | — | — | — |
| Ex. 8 | A | Copolyester | Polystyrene | 0.5 | 45 | 40 | PET | — | — | — |
| Ex. 9 | A | Acryl copolymer | Silica | 0.4 | 23 | 15 | PET | — | — | — |
| Ex. 10 | A | Acryl copolymer | Styrene/divinyl benzene copolymer | 0.5 | 37 | 30 | PEN | — | — | — |
| Ex. 11 | B | Acryl copolymer | Polystyrene | 0.5 | 70 | 50 | PEN | — | — | — |
| Ex. 12 | B | Copolyester | Polystyrene | 0.5 | 44 | 40 | PEN | — | — | — |
| Comp. Ex. 11 | A | — | Silica | 0.5 | 20 | 20 | PET | — | — | — |
| Comp. Ex. 12 | A | — | Polystyrene | 0.5 | 40 | 40 | PET | — | — | — |
| Comp. Ex. 13 | B | — | Acryl copolymer | 0.4 | 25 | 25 | PEN | — | — | — |
| Comp. Ex. 14 | B | Acryl copolymer | Titanium oxide | 0.05 | 50 | 40 | PEN | — | — | — |
| Comp. Ex. 15 | A | Acryl copolymer | Polystyrene | 0.5 | 50 | 12 | PET | — | — | — |
| Comp. Ex. 16 | A | Copolyester | Polystyrene | 0.5 | 45 | 40 | PET | — | — | — |
| Comp. Ex. 17 | B | Acryl copolymer | Polystyrene | 0.5 | 250 | 150 | PEN | — | — | — |
| Comp. Ex. 18 | A | Acryl copolymer | Polystyrene | 0.5 | 28 | 25 | PEN | — | — | — |

Ex.: Example,
Comp. Ex.: Comparative Example
(Note) Kinds of resin of the first film layer: A and B are the same as in Table 1

TABLE 5

| | Second film layer | | | | | | | | |
|---|---|---|---|---|---|---|---|---|---|
| | Particles C having maximum average particle diameter | | | | Other particles | | Constitution of layer thickness | | |
| | Kind of resin | Material | Average particle diameter [nm] | Content [wt %] | Material | Average particle diameter [nm] | Content [wt %] | Layer B [μm] | Layer A [μm] | Layer C [μm] |
| Ex. 7 | C | Acryl | 40 | 10 | — | — | — | 0.005 | 5.9 | 0.015 |
| Ex. 8 | C | Silica | 45 | 23 | — | — | — | 0.004 | 7.5 | 0.015 |
| Ex. 9 | PET | Silica | 300 | 0.10 | Silica | 80 | 0.30 | 0.005 | 5.7 | 0.700 |
| Ex. 10 | C | Acryl | 40 | 15 | — | — | — | 0.008 | 4.0 | 0.022 |
| Ex. 11 | D | Silica | 80 | 5 | Silica | 20 | 15 | 0.006 | 4.8 | 0.030 |
| Ex. 12 | PEN | Silicone | 500 | 0.01 | Silica | 100 | 0.25 | 0.005 | 4.0 | 0.600 |
| Comp. Ex. 11 | C | Acryl | 40 | 10 | — | — | — | 0.005 | 5.9 | 0.015 |
| Comp. Ex. 12 | C | Acryl | 40 | 10 | — | — | — | 0.008 | 9.0 | 0.028 |
| Comp. Ex. 13 | D | Silica | 80 | 5 | Silica | 20 | 15 | 0.007 | 4.2 | 0.012 |
| Comp. Ex. 14 | PEN | Silicone | 500 | 0.01 | Silica | 100 | 0.25 | 0.005 | 4.0 | 0.600 |
| Comp. Ex. 15 | C | Acryl | 40 | 10 | — | — | — | 0.005 | 5.9 | 0.015 |
| Comp. Ex. 16 | C | Acryl | 40 | 10 | — | — | — | 0.001 | 6.4 | 0.018 |
| Comp. Ex. 17 | C | Silica | 45 | 23 | — | — | — | 0.025 | 5.5 | 0.031 |
| Comp. Ex. 18 | PEN | Silicone | 500 | 0.01 | Silica | 100 | 0.25 | 0.010 | 7.5 | 0.800 |

Ex.: Example,
Comp. Ex.: Comparative Example
(Note) Kinds of resin of the second film layer: C and D are the same as in Table 2

TABLE 6

| | Characteristics of first film layer | | | | | | | Characteristics of magnetic recording medium | | | | |
|---|---|---|---|---|---|---|---|---|---|---|---|---|
| | Density of protrusions [/mm²] | Coarse agglomerates [/mm²] | Agglomeration rate [%] | AFM roughness ARa_B [nm] | ARz_B [nm] | $d_B/dc_B$ | $t_B/dc_B$ | Film characteristics Abrasion resistance | Wind-up property | Electromagnetic conversion characteristics C/N | D/O | Running durability |
| Ex. 7 | 120000 | 0.05 | 5.7 | 1.5 | 23 | 1.12 | 0.20 | ◎ | ○ | ◎ | ◎ | ○ |
| Ex. 8 | 50000 | 0.02 | 3.2 | 2.4 | 36 | 1.13 | 0.10 | ◎ | ○ | ○ | ◎ | ○ |
| Ex. 9 | 500000 | 0.20 | 7.5 | 2.1 | 15 | 1.53 | 0.33 | ○ | ◎ | ○ | ○ | ◎ |
| Ex. 10 | 180000 | 0.07 | 2.8 | 1.5 | 28 | 1.23 | 0.27 | ◎ | ○ | ○ | ◎ | ○ |
| Ex. 11 | 70000 | 0.02 | 1.9 | 1.9 | 45 | 1.40 | 0.12 | ◎ | ○ | ○ | ◎ | ○ |
| Ex. 12 | 250000 | 0.13 | 6.7 | 2.8 | 35 | 1.10 | 0.13 | ◎ | ◎ | ○ | ○ | ◎ |
| Comp. Ex. 11 | 220000 | 5.20 | 38 | 2.5 | 35 | 1.00 | 0.25 | × | ○ | × | ×× | ◎ |
| Comp. Ex. 12 | 100000 | 1.80 | 5.1 | 2.4 | 39 | 1.00 | 0.20 | × | ○ | ○ | × | ○ |
| Comp. Ex. 13 | 220000 | 0.08 | 3.8 | 1.4 | 18 | 1.00 | 0.28 | ◎ | ○ | ○ | ◎ | × |
| Comp. Ex. 14 | 500000 | 0.31 | 8.5 | 3 | 55 | 1.25 | 0.13 | ○ | ○ | × | ○ | × |
| Comp. Ex. 15 | 200000 | 0.06 | 4 | 1.9 | 34 | 4.17 | 0.42 | ◎ | ○ | ○ | ◎ | × |
| Comp. Ex. 16 | 70000 | 0.14 | 8 | 2.3 | 39 | 1.13 | 0.03 | × | ○ | ○ | × | ○ |
| Comp. Ex. 17 | 50000 | 0.03 | 2.7 | 8.7 | 120 | 1.67 | 0.17 | × | ○ | × | × | ◎ |
| Comp. Ex. 18 | 1300000 | 0.38 | 8.9 | 5.2 | 28 | 1.12 | 0.40 | × | ○ | × | × | ◎ |

Ex.: Example,
Comp. Ex.: Comparative Example

As is evident from Tables 3 and 6, the laminate film of the present invention is superior in abrasion resistance and wind-up property in the film forming process and extremely excellent in electromagnetic conversion characteristics, drop out characteristics and running durability when it is used as a magnetic recording medium. On the other hand, films which do not meet the requirements of the present invention do not have these characteristic properties at the same time.

According to the present invention, it is possible to provide a laminate film which is excellent in abrasion resistance and wind-up property in the film forming process and is useful as a base film for a magnetic recording medium which is excellent in electromagnetic conversion characteristics, drop out characteristics and running durability.

What is claimed is:

1. A laminate film comprising:

(A) a base layer comprising a thermoplastic resin; and (B) a first film layer which is present on at least one side of the base layer and comprises core-shell particles, each consisting of a core and a shell, and a hydrophilic resin, the shell of the core-shell particle having a lower secondary transition point than the core, the core-shell particles having an average particle diameter of 5 to 100 nm, satisfying the following expressions (1) and (2) at the same time, $$1.01 \leq d_B/dc_B \leq 3.0 \tag{1}$$

wherein $d_B$ is an average particle diameter (nm) of the core-shell particles and $dc_B$ is an average diameter (nm) of the cores of the core-shell particles, and $$0.05 \leq t_B/dc_B \leq 0.8 \tag{2}$$

wherein $t_B$ is a thickness (nm) of the first film layer and $dc_B$ is defined as above, and producing surface protrusions at a density of $1 \times 10^6$ to $1 \times 10^8/\text{mm}^2$ on the surface of the first film layer, and the number of protrusions having a height of not smaller than 0.5 μm being not more than 0.5/mm².

2. The laminate film of claim 1, wherein the base layer (A) comprising the thermoplastic resin contains substantially no inert particles.

3. The laminate film of claim 1, wherein the base layer (A) comprising the thermoplastic resin contains inert particles (A).

4. The laminate film of claim 3, wherein the inert particles A have an average particle diameter of 40 to 400 nm, a volume shape factor of 0.1 to π/6 and produce protrusions at a density of 5,000 to 50,000/mm² on the surface of the base layer.

5. The laminate film of claim 1, wherein the shell of the core-shell particle has a secondary transition point of not higher than 80° C.

6. The laminate film of claim 1, wherein the agglomeration rate of the core-shell particles in the first film layer is not more than 10%.

7. The laminate film of claim 1, wherein the surface of the first film layer satisfies the following expressions (3) and (4):

$$0.3 \leq ARa_B \leq 5.0 \tag{3}$$

wherein $ARa_B$ is a center line surface roughness (nm), and $$10 \leq ARZ_B \leq 100 \tag{4}$$

wherein $ARZ_B$ is a ten-point average roughness (nm).

8. The laminate film of claim 1, wherein the hydrophilic resin is selected from the group consisting of acrylic resins, polyester resins and acryl-polyester resins.

9. The laminate film of claim 1, wherein the first film layer is present on one side of the base layer (A) and a second film layer containing inert particles C is present on the other side of the base layer (A).

10. The laminate film of claim 9, wherein the second film layer is a coating layer.

11. The laminate film of claim 10, wherein the second film layer contains inert particles having an average particle diameter of 20 to 200 nm in a proportion of 1 to 50% by weight based on the second film layer.

12. The laminate film of claim 9, wherein the second film layer is formed by coextrusion together with the base layer (A).

13. The laminate film of claim 12, wherein the second film layer contains inert particles having an average particle diameter of 0.1 to 1 μm in a proportion of 0.001 to 5.0% by weight based on the second film layer.

14. The laminate film of claim 1 or 9 which has a thickness of 2.5 to 20 μm.

15. The laminate film of claim 1 or 9 which is used as a base film for a magnetic recording medium.

16. A magnetic recording medium comprising the laminate film of claim 1 or 9 and a metal thin film magnetic layer present on the first film layer of the laminate film.

17. A magnetic recording medium comprising the laminate film of claim 1 or 9 and a coated magnetic layer present on the first film layer of the laminate film.

18. The magnetic recording medium of claim 16 which is for recording digital signals.

19. The magnetic recording medium of claim 17 which is for recording digital signals.

* * * * *